Nov. 1, 1932.  A. S. McDONNELL  1,885,459
LOCK NUT
Filed July 24, 1930
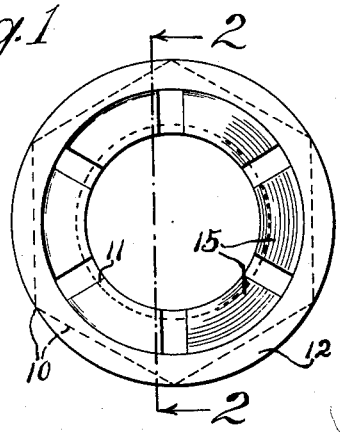
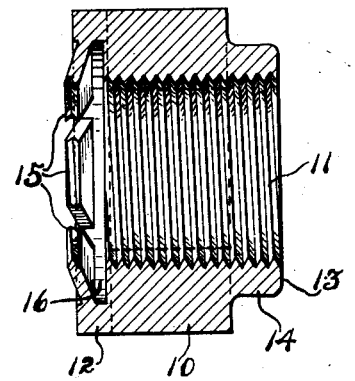
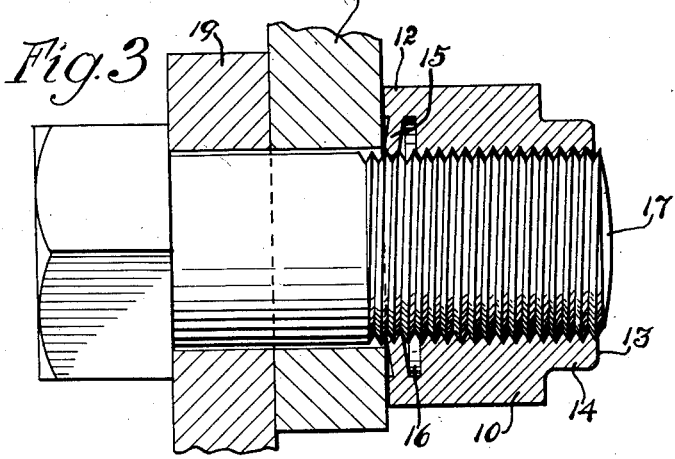
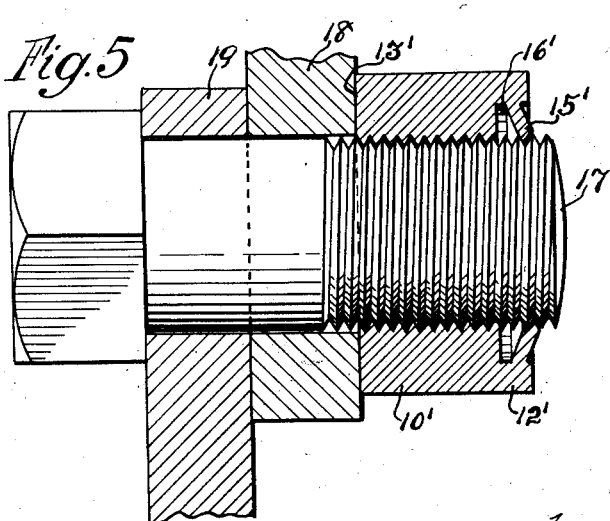
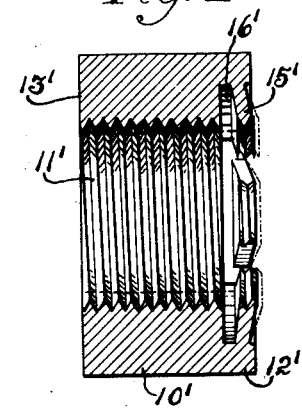
Inventor
Aloysius S. McDonnell
by J. Daniel Stuwe,
Attorney.

Patented Nov. 1, 1932

1,885,459

UNITED STATES PATENT OFFICE

ALOYSIUS S. McDONNELL, OF CHICAGO, ILLINOIS

LOCK-NUT

Application filed July 24, 1930. Serial No. 470,372.

My invention relates to a lock-nut, and more particularly to the type wherein the locking means is combined with the main portion or body of the nut and is made integral therewith.

Some of the prime objects of this invention are:

1st.—To provide a highly efficient, one-piece, lock-nut, which has the locking means or locking elements arranged so that the nut may be used with either end face turned forward; and more particularly to provide such a lock-nut which is arranged to have the locking elements set and left in the original threaded position, to be applied to a bolt with the locking elements forwardly, so as to clinch them by the final wrenching of the lock-nut to its holding position on the bolt; or which may also have the locking elements set into a gripping position preferably during the process of its manufacture, so as to be applied with the locking elements extending outwardly on the bolt for locking the nut thereon.

2nd.—To provide a lock-nut having a high locking efficiency with either end face placed forwardly on the bolt and against the object to be held thereon.

3rd.—To produce a lock-nut which can have its locking elements entirely enclosed and protected, when used as hereinafter described.

4th.—To arrange the lock-nut so that it possesses maximum strength and is also economical in requirement of bolt length.

5th.—To provide a construction which may be cheaply manufactured, and may be quickly applied and removed, and used repeatedly.

6th.—To arrange the construction so that it can be used to lock an object on a bolt, and can also be used to hold an object in a limited way or loosely on the bolt, in a manner to allow the object to revolve, swing, oscillate, or have other motion thereon.

7th.—To arrange the lock-nut so that its locking elements will not interfere with nor prevent any of the finishing of either one or both end faces, nor of any part of the exterior of the nut; and so that its locking elements will be adaptable to various exterior forms of nut construction, as square, hexagonal, round, cap-nut, collar-nut, and various other shapes, also to be incorporated with the threads in single and in multiple turnbuckle nuts, and in parts of machines, such as wheel hubs using threaded spokes, and other machine parts where it is desirable to maintain a tight grip on threaded parts.

These objects and other objects and advantages are attained with this invention, as will become apparent from the following description, taken in connection with the accompanying drawing, it being understood that slight changes in the form, placement, angle, and number of binding jaws, and proportions and details of construction may be resorted to without departing from the spirit or sacrificing any of the advantages of the invention.

In the drawing:—

Fig. 1 is an end view of my improved lock-nut, in its preferred form of construction, illustrating the end face with the locking means.

Fig. 2 is a cross-sectional view, taken on line 2—2 of Fig. 1, showing the lock-nut with the locking means or binding jaws set in the normal position in which they were originally formed and threaded.

Fig. 3 is a cross-sectional view of a lock-nut shown in assembly with a bolt and holding a number of parts thereon, the binding jaws being shown forced backwardly to their gripping position by the final wrenching.

Fig. 4 is a cross-sectional view of the lock-nut having its binding jaws set or forced inwardly into the binding position before application, the original or normal outwardly-extending position of the jaws, in which they were threaded with the nut, being indicated in dotted lines.

Fig. 5 is a cross-sectional view showing this lock-nut, with its jaws previously set, in assembly with a bolt and a number of parts held thereon, the jaws being constantly in gripping position although forced slightly outwardly during application.

As illustrated in the drawing, my improved lock-nut, in its various forms of construction, has its several parts made integral, and has its locking means formed at one end of the main portion or body portion of the nut.

In Figs. 1, 2, and 3 of the drawing I have shown a preferred form of construction, comprising a main portion or body portion 10, which may be hexagonal, or of any suitable exterior form, and which has an opening or bore of the desired size extending centrally, axially therethrough, threads 11 of the desired size and pitch being provided in the walls of the bore. An enclosing portion 12, for enclosing and protecting the locking means, and which also forms a sustaining wall for sustaining the strain of operation of the nut, is provided at one end of the body portion 10, and in the form of construction shown in Figs. 1, 2, and 3 of the drawing this enclosing and sustaining portion 12 appears in the shape of a cylindrical portion or collar; while this nut may have at its other end 13 a reduced portion 14 which is trimmed and shaped as may be desired, as indicated in said Figs. 1, 2, and 3 of the drawing.

The locking means provided in this invention may consist of one or more locking elements, which are preferably arranged in the form of substantially segmental gripping jaws or fingers 15, a plurality thereof being preferably provided. These fingers or elements are preferably formed integral with the enclosing portion or collar 12 and extend inwardly therefrom toward the axis extending longitudinally through the bore in the nut, and they slant slightly outwardly from the body portion, substantially as shown in Fig. 2. The fingers are spaced from the body portion, forming a recess or groove 16 between said fingers and portion, within the enclosing collar 12, said recess being of larger cross-section than the threaded bore in the nut, and having its outer wall preferally formed parallel with the exterior wall of the enclosing portion 12, in the present form both being cylindrical.

This lock-nut is preferably made with its locking elements or fingers extending at a slant or angle outwardly from the body portion, and it is then threaded with the fingers so extending in their original position, as indicated in Fig. 2; and when it is then applied on a bolt 17, with these gripping fingers slanting forwardly thereon, to bear against an object or part 18 for forcing and holding it tightly against its companion object or part 19, said fingers will, through their pressure against said object 18, be clinched and driven into a firm binding or locking engagement with the threads of the bolt through the final wrenching operation.

The locking fingers are bendable, and, with the lock-nut constructed and the parts arranged as disclosed herein, upon the final wrenching of the nut upon the bolt, these fingers will be bent into said recess and toward the body portion, whereby they are caused to move substantially diametrically toward the axis of the nut and of the bolt upon which the nut is being applied, thereby producing a double binding action, namely a longitudinal grip and a transverse grip on the bolt when the nut is completely applied thereon, as indicated in Fig. 3.

By applying the lock-nut as set forth above, with the locking fingers positioned forwardly, or on the inside against the object 18 to be held, the collar or enclosing portion 12, which is positioned around the fingers, forms a continuous wall around them, which serves the double purpose of providing a sustaining wall or sustaining means for fully sustaining the pressure or strain of operation upon the lock nut, and also to provide enclosing means for enclosing and protecting the locking means and prevent the entrance of dirt and grit and foreign matter and any clogging or corrosion of the threads of the fingers or of the body portion or of the bolt engaged thereby. This feature becomes very essential and of great advantage in many places, as for example in use with rail joints, where it is especially desirable to keep sand, gravel, and water, and other foreign matter away from the threads of the nut and bolt.

The lock-nut of this invention is also adapted to be applied with its locking end, which contains the locking elements, positioned at the outward side, and the opposite end or plain end of the nut positioned at the inward side, as indicated in Fig. 5, to be effective in confining the objects 18 and 19 on the bolt 17; and this lock-nut may thus be furthermore used to hold said objects 18 and 19 either tightly together on the bolt, or to hold them loosely together so as to permit relative movement of one object with respect to the other and upon the bolt, in a manner to permit the object to revolve, swing, oscillate, or have other required movement on the bolt.

For utilizing and applying my lock-nut in this manner, with the plain end face forward, the nut body portion 10' may have plain end 13' formed flat, as shown in Figs. 4 and 5, to provide a full seating surface across said end of the nut for engaging the object to be held thereby. The opposite end of the nut body portion is provided with the enclosing and sustaining portion 12' containing the locking fingers or elements 15' therein and the recess 16' between them and said body portion, said recess having its outer wall preferably extending parallel with the outer surface of said enclosing portion 12', to provide the proper thickness of wall around said locking fingers and to facilitate the bending thereof.

In this form, like in the preceding form, the lock-nut is made with the fingers slanting outwardly from the body portion, and the entire lock-nut is then threaded, thus forming the threads in the slanting fingers along with the threads 11′ in the body portion of the nut, such original slanting position of the fingers being indicated by the dotted lines in Fig. 4. After this threading operation these fingers 15′ are bent a short distance inward toward the body portion and into recess 16′, as shown in full lines in said Fig. 4, thereby pre-setting said fingers to their binding or gripping position. Such pre-setting of the locking fingers is preferably done during the process of manufacture of this lock-nut, to facilitate its ready use; but it may, of course, also be done thereafter by the user.

In utilizing the lock-nut the plain end face 13′ is placed inwardly on the bolt; and if the objects or parts 18 and 19 are to be held tightly together on the bolt, said end face 13′ is forced tightly against the object 18, the fingers by their resiliency and bendability being then flexed outwardly, as indicated in Fig. 5, and thereby taking a binding grip upon the threads of the bolt. Likewise the lock-nut may be wrenched less firmly, and so as to confine the objects loosely and movably on the bolt.

These lock-nuts may be made of any suitable material, but at present I prefer to make them, for general use, of cast malleable iron; and to core the inside surfaces to the desired shape, and then thread the lock-nuts as desired.

My improved lock-nut, with its bendable and somewhat resilient locking fingers, retains a firm grip upon the threads of the bolt, thereby securely holding the objects in position thereon; but, at the same time, it may be backed off the bolt by applying a strong wrenching force; and, as it is made of material to maintain its gripping power, it may thereafter also be reapplied.

I claim as my invention:

1. A lock-nut comprising a body portion having a threaded opening therein, and an integral collar containing and protecting a plurality of locking elements at one end of said body portion to co-operate with the threads therein for gripping a bolt, said elements being pre-set to the gripping position before its application on the bolt, thereby being effective in confining an object movably on the bolt.

2. A lock-nut comprising a body portion having a threaded opening therein for receiving a bolt, enclosing means at one end of said body portion and integral therewith, and segmental locking elements extending integral from said enclosing means and fully surrounded thereby for engaging the bolt, said elements extending at a slant forwardly from the body portion and being threaded in pitch with the threads in said body portion, being also bendable to adapt them for pre-setting for applying the lock-nut with said elements positioned outwardly on the bolt.

3. A lock-nut comprising a body portion having a threaded opening for receiving a bolt, a protecting collar extending integral from one end of said body portion, and segmental locking elements integral with and extending inwardly from said collar, said elements being spaced from the body portion thereby forming a recess between the elements and the portion to provide ample room for flexing of said elements, and the elements being spaced from the outer end of the collar whereby the collar completely surrounds and protects said elements and said recess, the elements slanting away from the body portion and being threaded in pitch with the threads therein adapted to be bent back for pre-setting to a gripping position before applying on a bolt, thereby adapting this lock-nut for confining an object movably on the bolt.

In testimony whereof I have signed my name to this specification.

ALOYSIUS S. McDONNELL.